United States Patent Office 3,385,843
Patented May 28, 1968

3,385,843
WATER-SOLUBLE YELLOW MONOAZO PYRAZOLONE DYE
Hermann Remy, and Johann Wenghöfer, West Warwick, R.I., assignors to Farbwerke Hoechst Aktiengesellschaft vormals Meister Lucius & Bruning, Frankfurt am Main, Germany, a corporation of Germany
No Drawing. Filed Dec. 3, 1965, Ser. No. 511,361
Claims priority, application Germany, Dec. 3, 1964, F 44,604
1 Claim. (Cl. 260—163)

The present invention relates to a valuable, hitherto unknown monoazo-dyestuff and to a process for preparing it; more particularly, the present invention relates to a water-soluble yellow monoazo-dyestuff of the formula

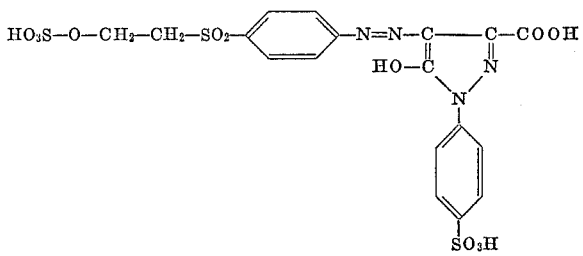

The dyestuff of the above formula is prepared according to methods known per se by diazotization and coupling which may be carried out in various ways. Thus, the above monoazo-dyestuff may be prepared, for example, by diazotizing the amine of the formula

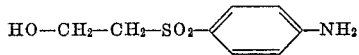

(1)

in the form of its acid sulfuric acid ester and coupling in the usual manner with the pyrazolone of the formula

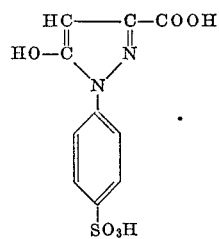

(2)

or by subsequently converting into its acid sulfuric acid ester the dyestuff intermediate product which contains β-hydroxyethyl-sulfone groups and which has been prepared by coupling according to known methods the diazotized amine of the Formula 1 with the pyrazolone of the Formula 2. Esterification of the coupling product obtained according to the second method can be carried out by treating it with amidosulfonic acid in the presence of appropriate organic solvents such, for example, as pyridine, at elevated temperature, or by treating the intermediate product with a sulfuric acid having a suitable concentration (90–100% $H_2SO_4$) at room temperature.

The dyestuff obtained according to the process of the present invention dyes vegetal fibers in the presence of alkaline agents or wool from neutral or weakly acid baths brilliant greenish yellow shades that have very good properties of wet fastness.

The following examples illustrate the invention, but they are not intended to limit it thereto:

EXAMPLE 1

59.8 parts by weight of 1-(4′-sulfophenyl)-3-carboxy-pyrazolone-(5) were dissolved in 200 parts by volume of water having 20° C. and a pH of 6.5.

This solution was introduced into a diazo suspension of 56.2 parts by weight of the sulfuric acid semiester of 1-aminobenzene-4-β-hydroxyethylsulfone, while keeping the temperature of the mixture below 15° C. by the addition of ice. The pH of the coupling solution was then increased to 6.4 by adding sodium carbonate and sodium bicarbonate and reduced to 5.8 after 2 hours by adding hydrochloric acid.

The ester dyestuff thus formed was salted out after some time by adding potassium chloride, the pH-value was reduced to 4.6 by means of hydrochloric acid and precipitation was completed by after-stirring for 24 hours. The product was then filtered with suction, washed with a 25% potassium chloride solution and dried.

The dyestuff thus prepared which corresponded to the formula

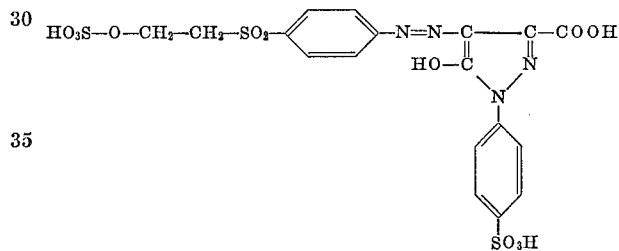

was obtained in excellent purity and in a yield of 106 parts by weight, corresponding to 92% of the theory.

EXAMPLE 2

20.1 parts by weight of 1-aminobenzene-4-β-hydroxyethylsulfone were diazotized in the usual manner and coupled with 29.9 parts by weight of 1-(4′-sulfophenyl)-3-carboxy-pyrazolone-(5) at a pH ranging from 6.0 to 6.5. The coupling product was completely precipitated after some hours by adding potassium chloride and filtered with suction.

The dried dyestuff intermediate product thus obtained was introduced into 320 parts by volume of pyridine and the mixture was heated to 80° C. 40 parts by weight of amidosulfonic acid were then added. Thereupon, the temperature rose quickly to about 100° C. and was kept for half an hour at 100° to 105° C. About 200 parts by volume of pyridine were then removed by distillation under reduced pressure and the residue was taken up in 400 parts by volume of water. The dyestuff was then salted out from its solution by adding potassium chloride and the pH-value of the reaction solution was reduced to 4.6. After having stirred for 24 hours, the dyestuff was filtered off, washed with a 25% potassium chloride solution and dried.

The dyestuff thus prepared, which was obtained in excellent purity and in a yield of 51.9 parts by weight, corresponding to 90% of the theory, was found to be identical with the product described in Example 1.

We claim:
1. The water-soluble yellow monoazo-dyestuff of the formula
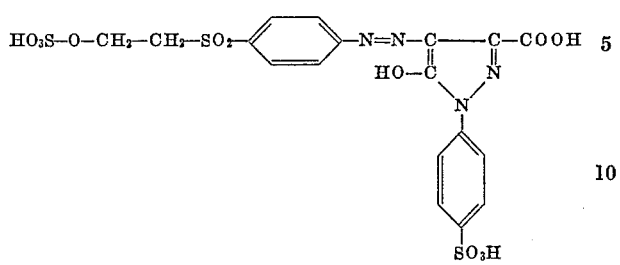
References Cited
UNITED STATES PATENTS
3,234,207  2/1966  Berner et al. _____ 260—162
FOREIGN PATENTS
973,569  10/1964  Great Britain.
CHARLES B. PARKER, *Primary Examiner.*
D. M. PAPUGA, *Assistant Examiner.*